United States Patent

[11] 3,601,319

| [72] | Inventor | David L. Jones, Jr.<br>Kettering, Ohio |
|---|---|---|
| [21] | Appl. No. | 5,718 |
| [22] | Filed | Jan. 26, 1970 |
| [45] | Patented | Aug. 24, 1971 |
| [73] | Assignee | General Motors Corporation<br>Detroit, Mich. |

[54] FLUID AMPLIFIER CONTROLLED WINDSHIELD WASHER SYSTEM
5 Claims, 3 Drawing Figs.

[52] U.S. Cl. .................................................. 239/284,
    137/81.5
[51] Int. Cl. ............................................... B05b 1/10,
    B60s 1/46
[50] Field of Search ......................................... 239/284,
    101, 102, DIG. 3; 137/81.5

[56] References Cited
UNITED STATES PATENTS
2,887,736 5/1959 Barrett .................. 239/284 X
3,423,025 1/1969 Rodger ................... 239/284
3,423,026 1/1969 Carpenter ................ 239/284

*Primary Examiner*—Lloyd L. King
*Attorneys*—W. E. Finken and W. A. Schuetz

ABSTRACT: In a preferred form, this disclosure relates to a washer system for delivering washer fluid to transparent surface areas such as different areas of a windshield or headlamps of an automotive vehicle. The washer system includes a reservoir containing a supply of washer fluid, nozzle means adapted to be positioned adjacent the transparent surface areas to be cleaned, a pump means for supplying washer fluid under pressure from the reservoir to the nozzle means, and a selectively operable control means including a fluid amplifier for controlling communication between the pump and the nozzle means and which is selectively operable to provide either a demand wash cycle or a programmed wash cycle of a predetermined duration.

INVENTOR
David L. Jones, Jr.
BY
W. A. Schuetz
ATTORNEY

FLUID AMPLIFIER CONTROLLED WINDSHIELD WASHER SYSTEM

The present invention relates to a washer system for washing transparent surface areas, such as different window portions or headlamps, of an automotive vehicle, and in particular to a washer system which is selectively operable to provide either a demand wash cycle or a programmed wash cycle of a predetermined duration.

An object of the present invention is to provide a new and improved washer system for cleaning transparent surface areas, such as different window portions or headlamps, of an automotive vehicle and in which the washer system can be selectively operated to provide either a demand wash cycle or a programmed wash cycle of a predetermined duration.

Another object of the present invention is to provide a new and improved washer system for cleaning transparent surface areas, such as different window portions or headlamps, of an automotive vehicle, and wherein the washer system includes a control means for controlling communication between a pump means and nozzles positioned adjacent the transparent surface areas to be cleaned, and in which the control means includes a manually manipulatable valve means having a valve member movable between an "ON" and "OFF " position and a time delay means including a fluid amplifier operatively connected with the valve means and which is operable to provide a programmed wash cycle in which the washer fluid is supplied to the transparent surface areas for a predetermined time period in response to momentary manipulation of said manually operable vale member.

Yet another object of the present invention is to provide a new and improved washer system for cleaning transparent surface areas, such as different window portions or headlamps, of an automotive vehicle and which includes a control means for controlling communication between a pump and nozzles positioned adjacent the transparent surface area to be cleaned and which is selectively operable to provide either a demand wash cycle or a programmed wash cycle of a predetermined duration, and in which the control means includes valve means having a manually manipulatable valve member biased toward an "OFF" position, but which is momentarily movable from its "OFF" position to either a first "ON" position in which it effects a demand wash cycle and a second "ON" position in which it effects a programmed wash cycle, and in which the control means includes a time delay means includes a fluid amplifier for controlling return movement of said valve member towards its "OFF" position when the latter has been moved to its second "ON" position and released so as to provide a programmed wash cycle of a predetermined duration.

Briefly, the above-noted objects are accomplished, in the preferred embodiment, by providing a selectively operable control means for controlling communication between a pump and nozzles positioned adjacent the transparent surface areas to be cleaned and which is selectively operable to provide either a demand wash cycle or a programmed wash cycle of a predetermined duration. The control means includes a valve means having a manually manipulatable valve member which is movable between an "OFF" position and first and second spaced "ON" positions and a baising means for biasing the valve member toward its "OFF" position. The valve means communicates the pump with a reservoir when the valve member is in the "OFF" position and the pump to the nozzles when in either of the first or second "ON" positions. The biasing means functions to return the valve member toward its "OFF" position upon the latter being moved to its first "ON" position and released whereby a demand wash cycle of operation is effected. The control means further includes a time delay means operatively connected with the valve means and which is ineffective to prevent the biasing means from returning the valve member toward its "OFF" position when moved to its first "ON" position, but which is operable to prevent the biasing means from returning the valve member to its "OFF" position when moved to its second "ON" position and released for a predetermined time period to provide a programmed wash cycle. The time delay means includes a fluid amplifier means for controlling return movement of the valve member toward its "OFF" position and a time delay valve means for controlling operation of the fluid amplifier means.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
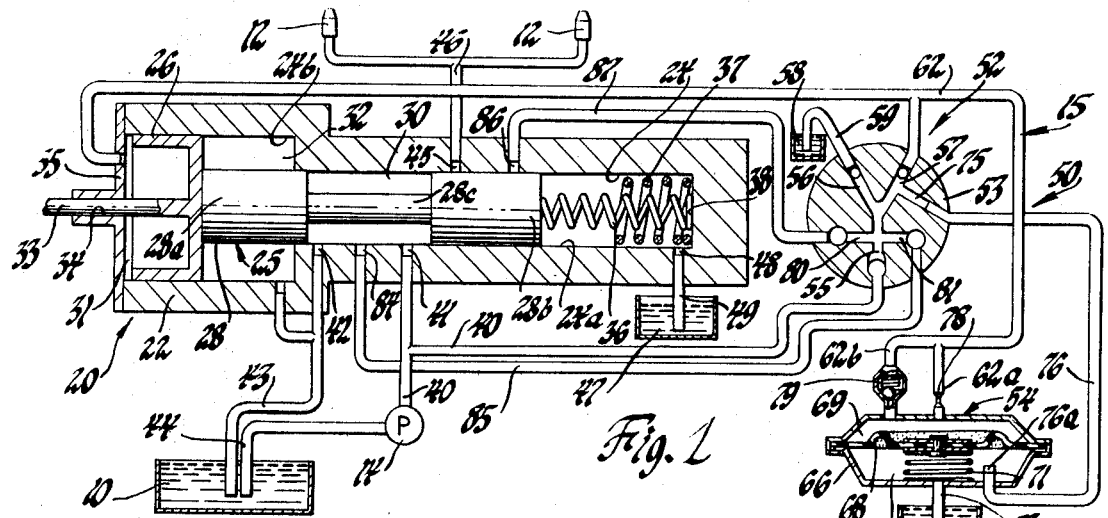
FIG. 1 is a schematic view of the washer system of the present invention and with the valve member shown in its "OFF" position.

The present invention provides a novel washer system for cleaning transparent surface areas of an automotive vehicle. Although the washer system could be employed for cleaning various different kinds of transparent surface areas, such as the rear or side windows or headlamps of a vehicle, it is particularly susceptible for use in cleaning the front window or windshield of a vehicle. For the purpose of description and illustration, the washer system will be herein described as being used for the latter purpose.

The washer system of the present invention comprises, in general, a reservoir or sump 10 for containing a supply of washer fluid or solution; a plurality of nozzles 12 which are adapted to be positioned adjacent the lower edge of a windshield of an automotive vehicle (not shown); a pump means 14 for supplying washer fluid under pressure from the reservoir 10 toward the nozzles 12 which direct the fluid against the windshield of the vehicle; and a selectively operable control means 15 for controlling communication between the pump means 14 and the nozzles 12 and which is selectively operable to provide either a demand wash cycle or a programmed wash cycle of a predetermined duration. The pump means 14 can be of any suitable or conventional construction and can either be constantly driven by the engine of the vehicle or be separately driven by a selectively energizable motor.

The control means 15 includes a control valve means 20 for controlling communication between the pump 14 and the nozzles 12. The control valve means 20 comprises a valve housing 22 having a central opening 24 therein. The opening includes a small diameter portion 24a and an enlarged diameter portion 24b at the left end portion of the housing 22.

Slidably received within the opening 24 in the valve housing 22 is manually manipulatable control valve member 25. The control valve member 25 includes a piston 26 which is slidably received within the opening portion 24b and which is integrally connected at its right side to a valve spool 28. The valve spool 28 includes a pair of spaced lands 28a and 28b and an intervening neck portion 28c. The neck portion 28c divides the opening portion 24b into a head end chamber 31 and a spool end chamber 32. The piston 26 at its left end is integrally connected to a piston rod 33 which extends through an opening 34 in an end cap 35 suitably secured to the left end of the housing 22. The piston rod 33 is either directly connected or connected by a linkage means to a manually shiftable control element (not shown).

The manually manipulatable valve member 25 is normally biased toward an "OFF" position, as shown in FIG. 1, by a spring biasing means in the form of a pair of nested compression springs 36 and 37. The springs 36 and 37 have one end in abutting engagement with the end surface 38 of the housing 22 and the inner spring 36 has its other end portion in abutting engagement with the right side of the land 28b of the valve spool 28 of the control valve member 25.

When the valve member 25 is in its "OFF" position, as shown in FIG. 1, the outlet of the pump 14 is in communication with the reservoir 10. The outlet of the pump 14 is connected by a conduit 40 to an inlet port 41 in the valve housing 22. The reservoir 10 is connected to an outlet port 42 in the valve housing 22 via a conduit 43 and to the inlet of the pump 14 via a conduit 44. When the valve member 25 is in its "OFF" position, as shown in FIG. 1, the inlet port 41 is in communication with the outlet port 42 via the annular recess 30. Communication between the inlet port 41 and an outlet port 45 which is connected to the nozzles 12 via conduit means 46 is blocked when the valve member 25 is in its "OFF" position by the land 28b of the valve spool 28. The chamber 32 is at right side of the piston 26 is at all times vented to the reservoir 10 by conduit means 43 and the chamber housing the springs 36 and 37 is at all times vented to a reservoir 47 via port 48 and conduit 49.

Figure 2:
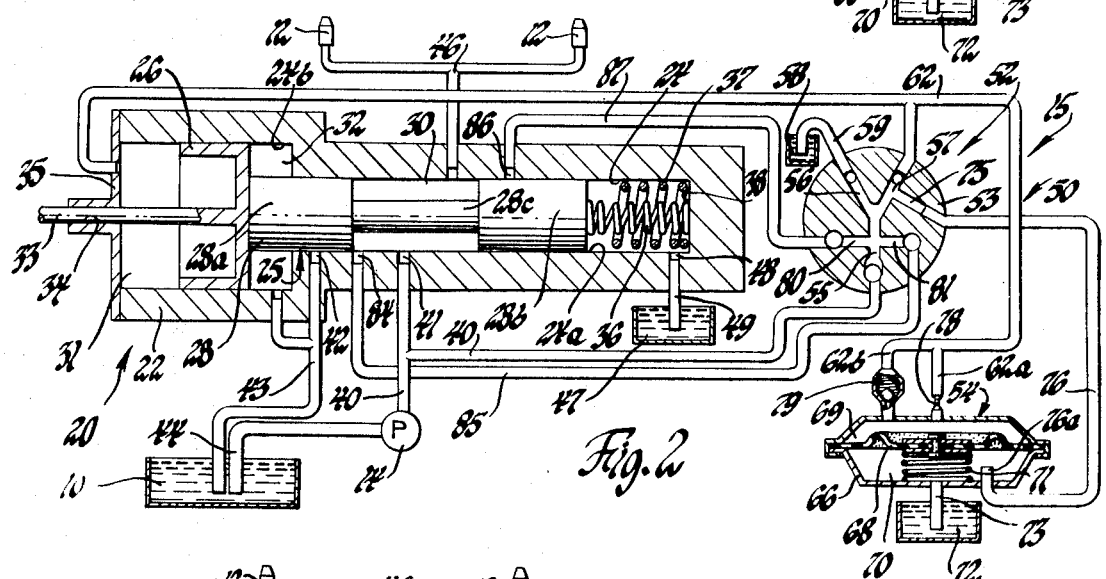
FIG. 2 is a view like that shown in FIG. 1, but showing the valve member in its first "ON" position.

The valve member 25 is movable from its "OFF" position, as shown in FIG. 1, in opposition to the biasing force of the spring 36 toward a first "ON" position, as shown in FIG. 2, by manually shifting the same to the right as viewed in the drawing. When the valve member 25 is in the first "ON" position shown in FIG. 2, the land 28a blocks the outlet port 42 and the land 28b is disposed to the right of the outlet port 45 so that fluid under pressure is delivered from the inlet port 41 via the annular recess 30 to the outlet port 45 and thence to the nozzles 12 via the conduit means 46. When the control valve member 25 is released upon being moved to its first "ON" position, the spring 36 will return the valve member 25 towards its "OFF" position, as shown in FIG. 1. This causes the land 28b to block the outlet port 45 and the annular recess 30 to uncover the outlet port 42 whereby the output from the pump 14 will be circulated back to the reservoir 10.

From the foregoing, it can be seen that by momentarily moving the valve member 25 to its first "ON" position, as shown in FIG. 2, washing fluid will be supplied to the nozzles 12 and that this fluid will be supplied until the valve member 25 is released. This provided a demand mode of washer operation. That is, washer fluid will be supplied to the nozzles 12 as long as control valve member 25 is manually held in its first "ON" position, as shown in FIG. 2.

Figure 3:
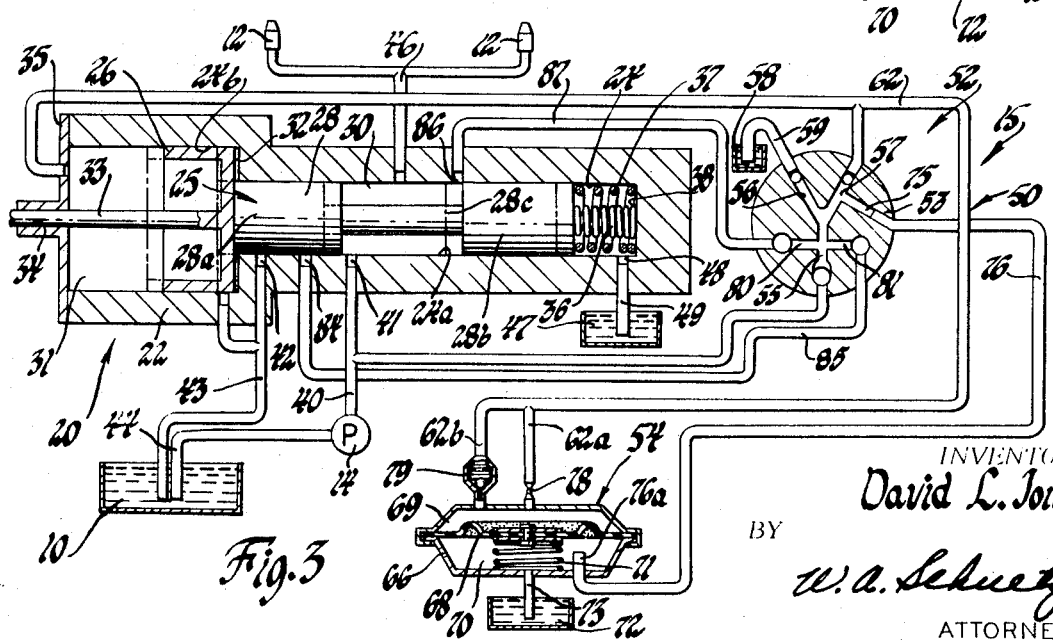
FIG. 3 is a view like that shown in FIG. 1, but showing the valve member in its second "ON" position.

The control valve member 25 can also be manually moved or shifted from its "OFF" position, as shown in FIG. 1, toward a second "ON" position, as shown in FIG. 3, in which it effects a programmed wash cycle of a predetermined duration. To this end, the valve means 20 is operatively connected with a time delay means 50 which automatically operates to prevent the valve member 25 from returning to its "OFF" position for a predetermined time period after the latter has been moved to its second "ON" position and released. After being released, the spring 37 moves the valve means 20 to the dotted line position, as shown in FIG. 3, and for a reason hereinafter described. After a predetermined time period is up, the spring 36 returns the valve member 25 toward its "OFF" position and thus, ends the programmed wash cycle.

The time delay means 50 includes a fluid amplifier 52 for controlling movement of the valve member 25 and a time delay valve means 54 for controlling operation of the fluid amplifier means 52. The fluid amplifier 52 comprises a housing 53 having an inlet leg 55 which is in communication with the conduit means 40, the latter conduit means being connected with the outlet of the pump 14. The fluid amplifier 52 also includes a pair of outlet legs 56 and 57 which diverge away from one another and which define with the inlet leg 55 a Y-shaped passage means. The outlet leg 56 is connected with a reservoir or sump 58 via a conduit 59. The outlet leg 57 is in communication with the chamber 31 in the housing 22 via a conduit means 62. The chamber is located at the left side of the piston 26. The conduit means 62 also communicates the outlet leg 57 with the time delay valve means 54.

The time delay valve means 54 comprises a suitable valve housing 66 having flexible diaphragm 68 whose outer periphery is secured to the housing 66 and which divides the housing into an upper chamber 69 and a lower chamber 70.

The diaphragm 68 is normally biased toward an open position, as shown in FIG. 1, by a compression spring 71 having one end in abutting engagement with the bottom of the housing 66 and its other end secured to the diaphragm 68. The chamber 70 is in constant communication with a reservoir or sump 72 via conduit 73. The chamber 70 is also in communication with a port 75 via conduit 76, the port 75 being in communication with and extending transversely of the second outlet leg 57 of the fluid amplifier 52. The conduit 76 has an end portion 76a which projects interiorly of the chamber 70.

The upper chamber 69 of the housing 66 is in communication with the second outlet leg 57 via the conduit means 62. The conduit means 62 includes a portion 62a having a fixed diameter orifice or restriction 78 therein and a conduit portion 62b having a one-way check valve 79 therein. The check valve 79 prevents fluid flow from the conduit 62 into the chamber 69, but allows fluid to flow from the chamber 69 into the conduit 62.

The fluid amplifier 52 also has a pair of oppositely disposed control ports 80 and 81 which extend transversely of the inlet leg 55 adjacent to juncture with the outlet legs 56 and 57. The control port 81 is in communication with an outlet port 84 in the valve housing 22 of the valve means 20 via a conduit 85. The control port 80 is in communication with a outlet port 86 in the valve housing 22 of the valve means 20 via a conduit 87.

When the valve member 25 is in either its "OFF" position as shown in FIG. 1, or its first "ON" position, as shown in FIG. 2, the flow of fluid through the inlet leg 55 of the fluid amplifier 52 is biased to flow through the outlet leg 56 to the reservoir 58. This is because in either of these positions, a portion of the flow of fluid from the inlet port 41 is directed to the outlet port 84, conduit 85 to the control port 81. At the same time, the outlet port 86 is blocked by the land 28b of the valve spool 28 when the valve member is in either of these positions. The fluid flowing through the control port 81 biases the fluid flowing through the inlet leg 55 toward the outlet leg 56.

When the valve member 25 is shifted from its "OFF" position, shown in FIG. 1, toward its second "ON" position, shown in FIG. 3, a programmed wash cycle of a predetermined duration is effected. When in the latter position, the fluid being supplied under pressure from the pump 14 flows from the inlet port 41 around the annular recess 30, outlet port 45 to the nozzles 12 to deliver washing fluid to the windshield. When the valve member 25 is in its second "ON" position, communication between the inlet port 41 and the outlet port 42, which is connected to the reservoir 10, is blocked by the land 28a and communication between the inlet port 41 and the outlet port 84, which is in communication with the control port 81 of the fluid amplifier 52, is blocked by the land 28a. In this position, however, land 28b is disposed to the right of outlet port 86 so that fluid is communicated from the inlet port 41 around the annular recess 30 to the outlet port 86 and thence via conduit 87 to the control port 80. When the fluid is supplied to the control port 80, it causes the fluid stream flowing through the inlet leg 55 to be shifted from the outlet leg 56 to the outlet leg 57. The shift of the fluid stream from the outlet leg 56 to the outlet leg 57 is very rapid.

When the valve means 20 is momentarily moved to its second "ON" position and released, the outer spring 37 shifts or moves the valve means 20 in a leftward direction to the dotted line position shown in FIG. 3. In this position the land 28b blocks the outlet port 86 while land 28a continues to block outlet port 84. This eliminates the bias flow at port 80 of the fluid amplifier 52. However, the fluid stream flowing through the inlet 56 continues to flow through the outlet leg 57 due to the Coanda effect or memory of the fluid amplifier 52.

When the fluid stream is shifted from the outlet leg 56 to the outlet leg 57, the stream is caused to flow through the conduit means 62 into the chamber 31 at the left side of the piston 26. This pressurizes the chamber 31 and holds the valve member 25 in the dotted line position shown in FIG. 3 in opposition to the biasing force of spring 36 after the same is manually moved to the second "ON" position, released and returned by spring 37 to its dotted line position. At the same time, the flow through the conduit means 62 also is directed via the conduit portion 62a into the closed chamber 69. This begins to pressurize the chamber 69 which causes the diaphragm 68 to be moved downwardly from its open position shown in FIG. 1 toward its closed position in which it engages conduit portion 76a. The outlet leg 57 is also in communication with the lower chamber 70 of the valve means 54 by the conduit 76. However, the pressure of the fluid in chamber 70 will be lower, since chamber 70 is vented to the reservoir 72 via the conduit 73.

The restriction 78 in the conduit portion 62a provides for a predetermined rate of pressure buildup in the chamber 69 and the diaphragm 68 will be deflected downwardly from its open position shown in FIG. 1 toward its closed position in which it engages the upper end of the conduit portion 76a. When this occurs, the outlet leg 57 is begins longer vented to the reservoir 72 via conduit 73 and the fluid flowing through the inlet leg 55 of fluid amplifier is load shifted to flow through the outlet leg 56 because it has no place to go but through the outlet leg 56 to the reservoir 58. When this occurs, the pressure in chamber 31 is relieved and the spring 36 begins to return the valve member 25 from its dotted line position toward its "OFF" position. As the valve member 25 is being returned toward its "OFF" position, the spring means 71 begins to return the diaphragm 68 toward its open position. As the diaphragm 68 moves toward its open position, as shown in FIG. 1, it uncovers conduit portion 76 and allows the fluid being displaced from chamber 31 to flow into the chamber 70 via conduit means 62 and 76 and thence into the reservoir 72. Fluid in the chamber 69 of the time delay valve 54 flows past the check valve 79 in the conduit portion 62b as the diaphragm 68 is being returned toward its normal open position by the spring 71. When the valve member 25 is returned to its "OFF" position, as shown in FIG. 1, the land 28b will block the outlet port 45 to terminate washer fluid being delivered to the windshield.

From the foregoing, it can be seen that the restriction 78 in the conduit portion 62a provides a delayed buildup of pressure in chamber 69 above the diaphragm 68 and thus, provides a time delay for causing the fluid stream of the fluid amplifier to be shifted from the outlet leg 57 to outlet leg 56, the fluid amplifier 52 serving to hold the valve member 25 in the dotted line position, as shown in FIG. 3, as long as the flow of fluid therethrough is through the outlet leg 57. This provides for a programmed washing cycle of the predetermined or substantially predetermined duration of time.

It will, of course, be understood that an adjustable restricted orifice could be employed in place of the restriction 78 if a variable time period for the programmed wash cycle were desired. Also, the various reservoirs or sumps 10, 47, 58 and 72 which are shown as separate on the schematic drawing, would preferably be replaced by single reservoir.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A washer system for delivering washer fluid to transparent surface areas, such as different areas of a windshield or headlamps, of an automotive vehicle comprising: a source of washer fluid; nozzle means adapted to be positioned adjacent to the transparent surface areas to be cleansed; pump means for supplying washer fluid under pressure from said reservoir to said nozzle means, and a selectively operable control means including a fluid amplifier for controlling communication between said pump means and said nozzle means and which is selectively operable to provide either a demand wash cycle or a programmed wash cycle in which washer fluid is supplied to the transparent surface areas for a predetermined time period.

2. A washer system for delivering washer fluid to transparent surface areas, such as different areas of a windshield or headlamps, of an automotive vehicle comprising: a source of washer fluid; nozzle means adapted to be positioned adjacent the transparent surface areas to be cleaned; pump means for supplying washer fluid under pressure from said reservoir to said nozzle means; and control means including a manual control and a fluid amplifier for controlling communication between said pump means and said nozzle means, said control means being operable to automatically provide a programmed wash cycle in which washer fluid is applied to the transparent surface areas for a predetermined time period in response to momentary manipulation and release of said manually operable control.

3. A washer system for delivering washer fluid to the transparent surface areas, such as the windshield or headlamps of an automotive vehicle comprising: a source of washer fluid; nozzle means adapted to be positioned adjacent the transparent surface areas to be cleaned; pump means for supplying washer fluid under pressure from said reservoir to said nozzle means; and selectively operable control means for controlling communication between said pump means and said nozzle means and which is operable to provide either a demand wash cycle or a programmed wash cycle, said control means including a valve member being movable between an "OFF" position and first and second spaced "ON" positions, biasing means for constantly biasing said valve member toward said "OFF" position, said valve means communicating said pump means to said reservoir when said valve member is in the "OFF" position and said pump means to said nozzle means when in either of said "ON" positions, said biasing means being operable to return said valve member toward its "OFF" position when the latter has been moved to its first "ON" position and then released, and time delay means including a fluid amplifier operatively connected to said valve means and being ineffective to prevent said biasing means to return said valve member towards its "OFF" position when released upon being moved to its first "ON" position, but which is operable to prevent the return of said valve member to its "OFF" position when the latter is moved to its second "ON" position and released for a predetermined time period to provide a programmed wash cycle of predetermined duration.

4. A washer system for delivering washer fluid to transparent surface areas, such as a windshield or headlamps, of an automotive vehicle comprising: a source of washer fluid; nozzle means adapted to be positioned adjacent transparent surface areas to be cleaned; pump means for supplying washer fluid under pressure from said reservoir to said nozzle means; and selectively operable control means for controlling communication between said pump means and said nozzle means and which is operable to provide a programmed wash cycle of predetermined duration, said control means including a valve means having a manually manipulatable valve member, said valve member being movable between an "OFF" position and an "ON" position, biasing means for biasing said valve member toward said "OFF" position, said valve means communicating said pump means to said reservoir when said valve member is in its "OFF" position ans said pump means to said nozzle when in its "ON" position, and time delay means including a fluid amplifier which is operable to prevent said biasing means to return said valve member to its "OFF" position when the latter is moved to its "ON" position and released for a predetermined time period to provide a programmed wash cycle of predetermined duration.

5. A washer system for delivering washer fluid to transparent surface areas, such as the windshield or headlamps of an automotive vehicle comprising: a source of washer fluid; nozzle means adapted to be positioned adjacent the transparent surface areas to be cleaned, pump means for supplying washer fluid under pressure from said reservoir to said nozzle means, said pump means including an inlet in communication with said reservoir and an outlet, and a selectively operable control means for controlling communication between said pump and said nozzle means and which is selectively operable to provide either a demand wash cycle or programmed wash cycle of predetermined duration, said control means including a valve means having a manually manipulatable valve member, said valve member being movable between an "OFF" position and first and second spaced "ON" positions, biasing means for biasing said valve member toward said "OFF" position, said valve means communicating said pump means to said reservoir when the valve member is in its "OFF" position and said pump means to said nozzle when in either of said "ON" positions, said biasing means being operable to return said valve member toward its "OFF" position when the latter is moved to its first "ON" position and then released whereby a demand wash cycle of operation is effected, and time delay means operatively connected with said valve means and being ineffective to prevent said biasing means to return said valve member toward its first "OFF" position when released upon being moved to its first "ON" position, but which is operable to prevent return of said valve member by said biasing means to its "OFF" position when moved to its second "ON" position and released for a predetermined time period to provide a programmed wash cycle of predetermined duration, said time delay means including a fluid amplifier having an inlet leg in communication with the outlet of said pump means and a pair of outlet legs, one of said outlet legs being connected with said reservoir and the other of said outlet legs being in communication with said valve member at its end opposite the biasing means, and a second valve means for controlling communication between said other outlet leg and the reservoir, said second valve means being movable between open and closed positions also being operatively connected with said other outlet leg, said second valve means being spring biased toward its open position, but movable toward its closed position in which it blocks communication between said other outlet leg and said reservoir in response to fluid flowing through said other outlet leg, said fluid amplifier also including a first control port in communication with the pump means for biasing said fluid stream flowing through said inlet toward said one outlet leg to the reservoir and a second control port which is supplied with fluid pressure only when said valve member has been moved to its second "ON" position to switch the flow of fluid from said one outlet leg to said other outlet leg to exert a biasing force on said valve member at its end opposite said biasing means, said fluid flowing through said second outlet leg moving said second valve means toward its closed position to block communication between said other outlet leg an the reservoir whereby the fluid stream flowing through the inlet leg is caused to be shifted from said other outlet leg toward said one outlet leg to allow said biasing means to return said valve member to its "OFF" position.

UNITED STATES PATENT OFFICE
CERTIFICATE OF CORRECTION

Patent No. 3,601,319              Dated  August 24, 1971

Inventor(s)   David L. Jones, Jr.

It is certified that error appears in the above-identified patent and that said Letters Patent are hereby corrected as shown below:

Column 1, line 31, "vale" should read -- valve --; line 46, "includes", second occurrence should read -- including --. Column 2, line 55, after "22 is" insert -- a --; lines 60, 61, and 62, delete "divides the opening portion 24b into a head end chamber 31 and a spool end chamber 32." and insert therefor -- defines with the housing 22 an annular recess 30. --; line 62, before "The piston 26 at its" insert -- The piston 26 divides the opening portion 24b into a head end chamber 31 and a spool end chamber 32. --. Column 3, line 14, "is at" should read -- at the --; line 39 "provided" should read -- provides --. Column 4, line 22 "to" should read -- its --. Column 5, line 18 "begins" should read -- no --. Column 5, Claim 1, line 68, "cleansed" should read -- cleaned --. Column 8, Claim 5, line 22 "an" should read -- and --.

Signed and sealed this 4th day of April 1972.

(SEAL)
Attest:

EDWARD M. FLETCHER, JR.            ROBERT GOTTSCHALK
Attesting Officer                  Commissioner of Patents